United States Patent
Bhupatiraju et al.

(10) Patent No.: US 12,365,347 B2
(45) Date of Patent: Jul. 22, 2025

(54) VEHICLE ROW FOLLOW SYSTEM

(71) Applicant: Zimeno Inc., Livermore, CA (US)

(72) Inventors: Rama Venkata Surya Kumar Varma Bhupatiraju, Fremont, CA (US); Deepak Rajasekhar Karishetti, Dublin, CA (US); Benjamin M. Gatten, Pleasanton, CA (US); Sanket Goyal, Pleasanton, CA (US)

(73) Assignee: Zimeno Inc., Livermore, CA (US)

( * ) Notice: Subject to any disclaimer, the term of this patent is extended or adjusted under 35 U.S.C. 154(b) by 0 days.

(21) Appl. No.: 18/663,046

(22) Filed: May 13, 2024

(65) Prior Publication Data
US 2024/0300499 A1 Sep. 12, 2024

Related U.S. Application Data

(63) Continuation of application No. 17/490,849, filed on Sep. 30, 2021, now Pat. No. 11,981,336.

(51) Int. Cl.
*B60W 40/10* (2012.01)
*A01B 69/00* (2006.01)
(Continued)

(52) U.S. Cl.
CPC .......... *B60W 40/10* (2013.01); *A01B 69/001* (2013.01); *A01B 69/004* (2013.01);
(Continued)

(58) Field of Classification Search
None
See application file for complete search history.

(56) References Cited

U.S. PATENT DOCUMENTS

| | | |
|---|---|---|
| 6,278,918 B1 | 8/2001 | Dickson et al. |
| 6,385,515 B1 | 5/2002 | Dickson et al. |

(Continued)

FOREIGN PATENT DOCUMENTS

| | | | | |
|---|---|---|---|---|
| AU | 2006202756 B | 1/2007 | | |
| AU | 2006202756 B2 * | 8/2011 | ........... | A01B 69/001 |

(Continued)

OTHER PUBLICATIONS

PCT International Search Report for PCT/US2021/052948 (Jun. 9, 2022).

*Primary Examiner* — Kevin R Steckbauer
(74) *Attorney, Agent, or Firm* — Rathe Lindenbaum LLP

(57) ABSTRACT

A vehicle row follow system may include a vehicle comprising at least one sensor to output signals serving as a basis for a three-dimensional (3D) point cloud and to output signals corresponding to a two-dimensional (2D) image of a region forward the vehicle. The system may further include a non-transitory computer readable medium containing instructions to direct a processor to: determine plan row lines in a 2D image; determine a yaw of the vehicle based upon a slope of a heading line relative to a centerline between the plant row lines in the 2D image; determine a lateral offset of the vehicle from the centerline between the consecutive plant rows based upon an identity of the consecutive plant rows in the 3D point cloud; and output steering control signals based upon the determined yaw and lateral offset of the vehicle.

11 Claims, 9 Drawing Sheets

(51) Int. Cl.
  *A01B 69/04* (2006.01)
  *B62D 15/02* (2006.01)
  *G05D 1/00* (2024.01)
  *G05D 1/227* (2024.01)
  *G06V 20/56* (2022.01)

(52) U.S. Cl.
  CPC .......... *A01B 69/008* (2013.01); *B62D 15/025* (2013.01); *G06V 20/56* (2022.01); *B60W 2420/403* (2013.01); *B60W 2520/14* (2013.01); *B60W 2552/15* (2020.02); *B60W 2552/53* (2020.02); *G05D 1/0088* (2013.01); *G05D 1/227* (2024.01); *G06T 2207/10028* (2013.01)

(56) References Cited

U.S. PATENT DOCUMENTS

| | | | |
|---|---|---|---|
| 6,686,951 B1 | 2/2004 | Dickson et al. | |
| 6,721,453 B1 | 4/2004 | Benson et al. | |
| 6,819,780 B2* | 11/2004 | Benson | B62D 1/28 |
| | | | 382/104 |
| 7,080,498 B2 | 7/2006 | Etcheverry | |
| 7,400,957 B2 | 7/2008 | Hofer et al. | |
| 7,904,218 B2* | 3/2011 | Jochem | G05D 1/0246 |
| | | | 701/28 |
| 10,104,827 B2* | 10/2018 | Adamchuk | B62D 5/0463 |
| 10,231,376 B1* | 3/2019 | Stanhope | F16M 13/022 |
| 10,455,755 B2* | 10/2019 | Stanhope | G05D 1/0246 |
| 10,672,138 B2 | 6/2020 | Germain et al. | |
| 10,721,859 B2* | 7/2020 | Wu | A01C 21/005 |
| 10,784,841 B2 | 9/2020 | Berkemeier et al. | |
| 10,874,044 B2 | 12/2020 | Cavender-Bares | |
| 11,112,802 B2* | 9/2021 | Aberle | G05D 1/0278 |
| 11,269,346 B2* | 3/2022 | Madsen | G01S 19/45 |
| 11,363,754 B2* | 6/2022 | Bertucci | G06V 20/58 |
| 2002/0106108 A1* | 8/2002 | Benson | G01C 11/00 |
| | | | 382/104 |
| 2007/0050117 A1* | 3/2007 | Kitzler | A01B 69/008 |
| | | | 701/41 |
| 2007/0271012 A1* | 11/2007 | Jochem | A01B 69/001 |
| | | | 701/28 |
| 2013/0116883 A1 | 5/2013 | Kormann | |
| 2017/0006759 A1* | 1/2017 | Adamchuk | B62D 1/00 |
| 2018/0373259 A1* | 12/2018 | Aberle | B62D 1/28 |
| 2018/0373264 A1* | 12/2018 | Madsen | G05D 1/0088 |
| 2019/0059199 A1* | 2/2019 | Stanhope | A01B 69/008 |
| 2019/0059206 A1* | 2/2019 | Stanhope | G10G 5/005 |
| 2019/0150357 A1* | 5/2019 | Wu | H04N 7/188 |
| 2020/0029489 A1* | 1/2020 | Bertucci | G05D 1/247 |
| 2020/0029490 A1* | 1/2020 | Bertucci | G05D 1/247 |
| 2020/0288625 A1* | 9/2020 | Pilzweger | A01B 69/008 |
| 2021/0000006 A1* | 1/2021 | Ellaboudy | A01B 69/008 |
| 2022/0377962 A1* | 12/2022 | Susko | G05D 1/0246 |
| 2023/0094371 A1* | 3/2023 | Varma Bhupatiraju | |
| | | | A01B 69/001 |
| | | | 701/1 |
| 2023/0102940 A1* | 3/2023 | Karishetti | G05D 1/0223 |
| | | | 701/300 |

FOREIGN PATENT DOCUMENTS

| | | | |
|---|---|---|---|
| AU | 2013201245 A1 * | 9/2013 | A01B 49/06 |
| BR | 102020008648 A2 * | 11/2020 | A01B 69/008 |
| BR | 102018067653 B1 * | 9/2021 | A01B 49/04 |
| CA | 2486518 A1 | 5/2005 | |
| CA | 3009217 A1 * | 12/2018 | A01B 61/044 |
| CA | 3066764 A1 * | 12/2018 | A01B 69/001 |
| CA | 3010357 A1 * | 2/2019 | A01B 49/04 |
| CA | 3010410 A1 * | 2/2019 | A01B 69/001 |
| CA | 3010357 C * | 7/2021 | A01B 49/04 |
| CA | 3010410 C * | 7/2021 | A01B 69/001 |
| DE | 102019111315 A1 * | 11/2020 | A01B 69/008 |
| EP | 1529428 A1 | 5/2005 | |
| EP | 2954772 A1 | 12/2015 | |
| EP | 3818799 A1 | 5/2021 | |
| EP | 3945393 A1 * | 2/2022 | A01B 69/008 |
| EP | 3945393 A9 * | 5/2022 | A01B 69/008 |
| EP | 4095643 A1 * | 11/2022 | A01B 69/001 |
| FR | 2881608 A1 | 8/2006 | |
| KR | 20210022995 A | 3/2021 | |
| RU | 2004132543 A | 4/2006 | |
| WO | WO-2021003336 A1 * | 1/2021 | A01B 69/001 |
| WO | WO-2023055383 A1 * | 4/2023 | A01B 69/001 |

\* cited by examiner

VEHICLE ROW FOLLOW SYSTEM

CROSS-REFERENCE TO RELATED PATENT APPLICATIONS

The present application claims priority under 35 USC § 120 from co-pending U.S. patent application Ser. No. 17/490,849 filed on Sep. 30, 2021, by Varma Bhupatiraju et al., the full disclosure of which is hereby incorporated by reference.

BACKGROUND

Many plants are grown in rows. In vineyards and orchards, the rows may be spaced so as to not overlap one another. Driving a vehicle between and along the rows or at a predefined position with respect to the rows may be challenging.

Figure 1:
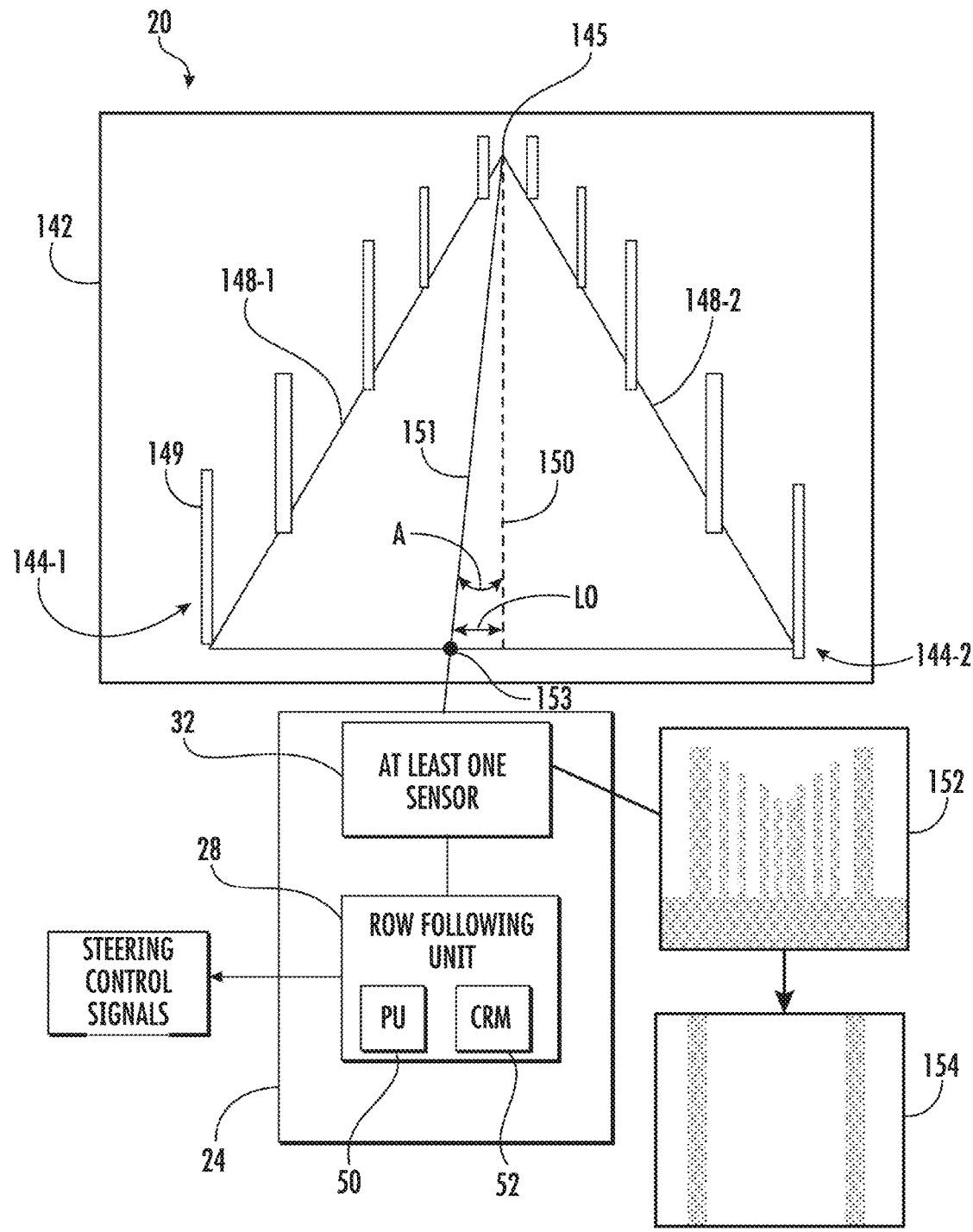
FIG. 1 is a diagram schematically illustrating portions of an example row follow system.

Throughout the drawings, identical reference numbers designate similar, but not necessarily identical, elements. The FIGS. are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example vehicle row follow systems, methods and mediums that facilitate the automated guidance of a vehicle between and along consecutive plant rows in a field, vineyard or orchard. The example vehicle row follow systems, methods and mediums facilitate navigation of the vehicle along a centerline between consecutive plant rows. In some implementations, the example vehicle row follow systems, methods and mediums facilitate such navigation independent of reliance upon predefined maps or global positioning system (GPS)/global navigation system (GNS) signals.

The disclosed vehicle row follow systems, methods and mediums use information or data from both 2D imagery and 3D point clouds to determine a relative positioning of a vehicle, such as a tractor, between the consecutive plant rows. Optical analysis is used to identify the consecutive rows in the 2D image. Each row in the 2D image may be characterized by a straight line extending at an angle to a vanishing point. The slope of lines representing the consecutive plant rows will vary depending upon a heading of the vehicle. For example, the two lines representing the consecutive plant rows will both have an angle of 45° with respect to a centerline between the rows when the vehicle has a heading that is parallel to both rows. The determined angle of the two lines representing the consecutive plant rows may be used to determine a yaw of the vehicle relative to the centerline between the rows.

The orientation of the vehicle between the consecutive plant rows is determined from the 2D image. Optical analysis used to identify the consecutive rows in the 2D image may rely upon various techniques. For example, texture mapping and feature extraction may be used to remove or disregard weeds and other noise in the 2D image. A plant may occupy most of the image and such optical analysis may involve an algorithm that analyzes different textures and removes unwanted plants growing in the middle between consecutive rows. A histogram and a vanishing point approach may further be used to remove remaining noise and any weeds or other nontarget plants not removed by the texture mapping and feature extraction. Noise between plant rows may lack a pattern compared to plant rows. Moreover, noise or weeds between the plant rows may not fit into a vanishing point. Additional thresholding techniques such as morphology and edge textures may further be used to detect the consecutive plant rows. Two crop/plant lines representing the two consecutive plant rows may be fit to structures within the 2D image using a probabilistic Hough Transform.

A centerline between the consecutive plant rows may also be determined from the left and right plant lines. A perspective transform may be used to get a birds-eye view of the image and to determine a heading line and its slope relative to the centerline. The slope of the heading line may correspond to a yaw of the vehicle. Such information may be used with the point cloud information to find the lateral offset of the vehicle from a centerline between the consecutive crop rows.

The lateral offset of the vehicle from between the consecutive crop rows (sometimes referred to as an intercept) is determined from the 3D point cloud. The 3D point cloud may be obtained from a stereo camera. In some implementations, the 3D point cloud may be provided by other types of sensors and techniques such as a light detection and ranging (LIDAR). The lateral offset of the vehicle is determined by identifying the consecutive crop rows in the 3D point cloud. The identification of the crop rows in the 3D point cloud may be based upon the identification of the crop rows in the 2D image.

In addition, the identification of the crop rows in the 3D point cloud may be based upon other optical analysis processes such as ground filters, clustering and the like. For example, a ground filter process may be applied to separate the ground and non-ground points such that the non-ground points are retained. The remaining points in the point cloud may be separated into clusters that represent separate objects in the 3D space, whereas noise is removed. In some implementations, such clusters are classified and labeled based upon image detection. The 3D point cloud provides Cartesian coordinates for the plants in the consecutive plant rows. These coordinates may be used to determine whether the vehicle is centered between the consecutive plant rows and whether the vehicle is laterally offset from the centerline which equally bisects the space between the consecutive plant rows.

The heading/yaw and its lateral spacing or lateral location between the consecutive plant rows is determined from both the 2D image and a 3D point cloud. The determined yaw and lateral spacing may be used by a controller to output control signals for adjusting the steering of the vehicle to navigate the vehicle accurately and reliably between and along the consecutive plant rows.

In some implementations, additional measures may be taken to address any line fitting noise that may exist. For example, in some implementations, wheel odometer (speed) and yaw rate of change signals obtained from inertial measurement units may be used to predict or estimate a second yaw and a second lateral offset of the vehicle with respect to the consecutive plant rows. Signals from wheel encoders may indicate a speed which may be used in conjunction with a yaw rate of change determination from the inertial measurement units to determine how the vehicle has moved in a horizontal plane and also how the heading of the vehicle may have changed over a predetermined time.

This wheel odometry information may be used to correct faulty crop line detections. The second yaw and the second lateral offset may be used as a basis for adjusting the yaw and the lateral offset estimates obtained from the 2D image and the 3D point cloud. In some implementations, the two yaw estimates (the perception-based estimates and the odometry-based estimates) and the two lateral offset estimates (the perception-based estimates and the odometry-based estimates) may be fused using a Kalman filter, such as an Extended Kalman filter, to yield a potentially more accurate estimate for the actual yaw/heading and lateral offset of the vehicle with respect to the centerline between the consecutive plant rows.

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

For purposes of this disclosure, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random-access memory (RAM) for execution by the processing unit from a read only memory (ROM), a mass storage device, or some other persistent storage. In other embodiments, hard wired circuitry may be used in place of or in combination with software instructions to implement the functions described. For example, a controller may be embodied as part of one or more application-specific integrated circuits (ASICs). Unless otherwise specifically noted, the controller is not limited to any specific combination of hardware circuitry and software, nor to any particular source for the instructions executed by the processing unit.

Further disclosed are example methods for estimating the heading/yaw of a vehicle and its lateral offset or spacing between consecutive plant rows. Disclosed is a method that uses a fully convolutional and network (FCN) to identify or determine navigable and non-navigable or obstruction regions in a 2D image based upon a prior set of training images. The navigable and non-navigable regions identified in the 2D image or frame are used to determine a slope of the plant rows in the 2D image and the corresponding yaw or heading of the vehicle.

Disclosed is an example method for determining a lateral offset of a vehicle between plant rows or from the centerline between plant rows using particle filtering. Particle filter clouds, representing a hypothesis of potential plant stem locations, are generated. For each particle within the particle filter cloud, neighboring points in the 3D point cloud are evaluated to compute a conditional probability of the particle predicting or constituting part of a vine stem. Based upon the determined probability, each particle is assigned to particle weight, wherein the weight of individual parts are compared to a predefined threshold. Particles with weights higher than a set threshold are retained for the nest frame estimation, and the rest are disposed. In one implementation, the threshold is set at 0.01. The total disposed particles are then respawned around the particles with highest weights in the next frame. The weighted average of all of the retained particles is determined to get an estimated plant stem position. In some implementations, the yaw and lateral offset estimates from the various estimates may be fused together, such as with an extended Kalman filter, to provide a more robust estimate for the current yaw and lateral offset of the vehicle. The final estimate for the yaw and lateral offset of the vehicle may be used to generate an output steering control signals to adjust or correct the positioning of the vehicle between consecutive plant rows. In some implementations, a vehicle speed based Pure Pursuit tracking method may be used to generate steering adjustment control signals.

Disclosed an example vehicle row follow system that may include a vehicle and at least one sensor carried by the vehicle to output signals serving as a basis for a three-dimensional (3D) point cloud and to output signals corresponding to a two-dimensional (2D) image of a region forward the vehicle. The system may further include a non-transitory computer readable medium containing instructions to direct a processor to: determine plant row lines in a 2D image; determine a yaw of the vehicle relative to a centerline between the consecutive plant rows based upon the plant row lines in the 2D image; determine a lateral offset of the vehicle from the centerline between the consecutive plant rows based upon an identity of the consecutive plant rows in the 3D point cloud; and output steering control signals based upon the determined yaw and lateral offset of the vehicle.

Disclosed is an example vehicle row following method. The example method may comprise: (1) acquiring a two-dimensional image of a region forward a vehicle, the image depicting consecutive plant rows; (2) acquiring a three-dimensional (3D) point cloud of the region; (3) determining a plant row lines in the 2D image; (4) determining a yaw of the vehicle relative to a centerline between the consecutive plant rows based upon the plant row lines in the 2D image; (5) identifying the consecutive plant rows in the 3D point cloud; (6) determining a lateral offset of the vehicle from the centerline between the consecutive plant rows based upon the identity of the consecutive plant rows in the 3D point cloud; and (7) outputting steering control signals based upon the determined yaw and lateral offset of the vehicle.

Disclosed is an example non-transitory computer-readable medium containing instructions to direct a processor. The instructions may comprise: 2D image acquisition instructions for acquiring a two-dimensional image of a region forward a vehicle, the image depicting consecutive plant rows; 3D point cloud acquisition instructions for acquiring a three-dimensional (3D) point cloud of the region; row line instructions for determining plant row lines in the 2D image; vehicle yaw instructions for determining a yaw of the vehicle relative to a centerline between the consecutive plant rows based upon the plant row lines in the 2D image; point cloud row identifying instructions for identifying the consecutive plant rows in the 3D point cloud; lateral offset instructions for determining a lateral offset of the vehicle from the centerline between the consecutive plant rows based upon the identity of the consecutive plant rows in the 3D point cloud; and steering response instructions for outputting steering control signals based upon the determined yaw and lateral offset of the vehicle.

FIG. 1 is a diagram schematically illustrating portions of an example vehicle row follow system 20. System 20 is configured to facilitate navigation of the vehicle along a centerline between consecutive plant rows. In some implementations, the example vehicle row follow systems, methods and mediums facilitate such navigation independent of reliance upon predefined maps or global positioning system (GPS)/global navigation system (GNS) signals. System 20 uses information or data from both 2D imagery and 3D point clouds to determine a relative positioning of a vehicle, such as a tractor, between the consecutive plant rows.

System 20 comprises vehicle 24 and row following unit 28. In some implementations, vehicle 24 is configured to be automatically steered or directed along and between consecutive rows of plants without direct human intervention or input. In some implementations, vehicle 24 is manually steered or driven, but wherein vehicle 24 provides alerts or steering guidance to the person controlling the navigation of vehicle 24. For example, should vehicle 24 stray from a prescribed path between consecutive crop rows during such manual steering by an operator, vehicle 24 may output an alarm or other visible or audible notice suggesting correction by the operator.

Vehicle 24 is configured to carry out operations on plants arranged in rows. Such rows may be part of a field, orchard or vineyard. Examples of such operations include, but not limited to, planting, monitoring plants, applying herbicide, insecticide, water and/or fertilizer, pruning, harvesting or other management operations. In some implementations, vehicle 24 may push, tow or carry and implement to carry out such operations. In some implementations, vehicle 24 may comprise a tractor. In other implementations, vehicle 24 may comprise other forms of vehicle such as a truck or the like.

Vehicle 24 comprises at least one sensor 32 that is configured to output (1) signals serving as a basis for a 3D point cloud and (2) signals corresponding to a 2D image of a region forward vehicle 24. In some implementations, the at least one sensor 32 is mounted to vehicle 24 so as to face in a forward direction. In some implementations, the at least one sensor 32 is mounted to vehicle 24 along a centerline of the vehicle 24 such that its position and center of focus is aligned with the logical centerline of the vehicle 24. In some implementations, the lease once a sensor 32 is mounted or provided as part of a roof of vehicle 24.

In some implementations, the at least one sensor 32 comprises a stereo camera having two or more lenses with a separate image sensor or film frame for each lens. The stereo camera output signals for both the 2D image and the 3D point cloud. In some implementations, the three-dimensional images captured by the stereo camera may be transformed into the 3D point cloud with photogrammetry software. In some implementations, a two-dimensional camera may be used for the 2D image and other sensors, such as a LIDAR sensor may be used for the 3D point cloud.

Row following unit 28 automatically determines the relative position of vehicle 24 between the consecutive plant rows and automatically determines the heading or yaw of vehicle 24 relative to the consecutive plant rows. Based upon the determined yaw and the determined positioning or spacing between the consecutive plant rows, row following unit 28 outputs steering control signals. In some implementations, such steering control signals may direct a steering actuator to reorient wheels or other ground engaging members of the vehicle to directly alter or adjust the current heading or steering of vehicle 24.

In some implementations, such steering control signals may cause an audible or visual communication or alert to be output to a human operator of vehicle 24, wherein the communication or alert notifies the human operator that the steering of vehicle 24 should be adjusted. For example, in some implementations, a display may present a predefined path for vehicle 24 and may also present the current path of vehicle 24 on the same screen, wherein the current path of vehicle 24 may be adjusted on the screen as the human operator adjusts the steering. In such an implementation, the human operator may adjust the steering left such as by turning a steering wheel, moving a joystick or the like until the displayed line on the monitor representing or indicating the current path of vehicle 24 coincides with the line on the monitor representing the target path of vehicle 24 between the consecutive pairs of plant rows.

Row following unit 28 comprises processing unit 50 and a non-transitory computer-readable medium 52. Processing unit 50 follows instructions contained in medium 52.

Figure 2:
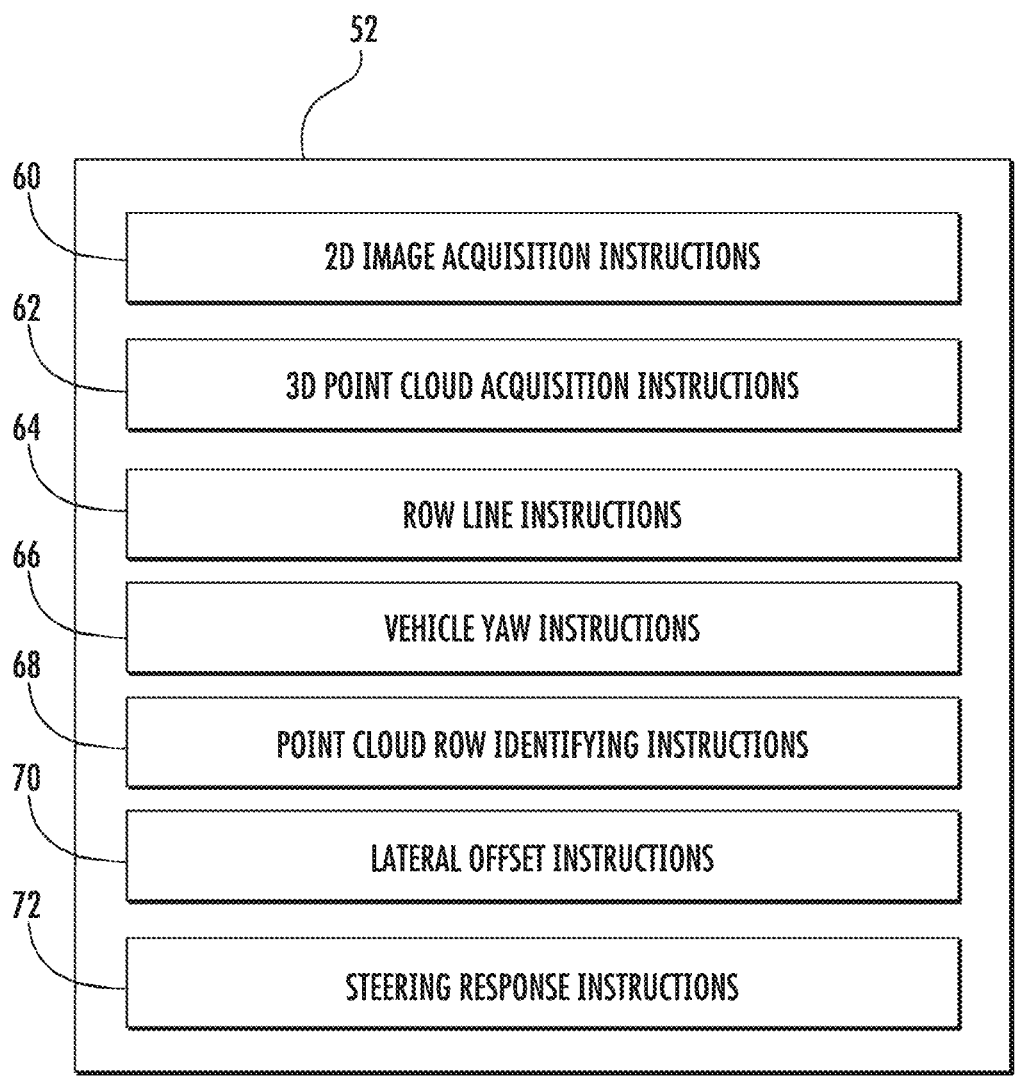
FIG. 2 is a diagram schematically illustrating portions of an example non-transitory computer-readable medium of the example row follow system of FIG. 1.

Non-transitory computer-readable medium 52 comprises a persistent storage device storing recorded instructions for processing unit 50. Examples of medium 52 include, but are not limited to, solid-state memory (flash memory), disk memory and the like. As shown by FIG. 2, medium 52 comprises 2D image acquisition instructions 60, 3D point cloud acquisition instructions 62, row line instructions 64, vehicle yaw instructions 66, point cloud row identifying instructions 68, lateral offset instructions 70 and steering response instructions 72. Instructions 60-72 direct processing unit 50 to carry out the example vehicle row following method 100 outlined in FIG. 3.

Figure 3:
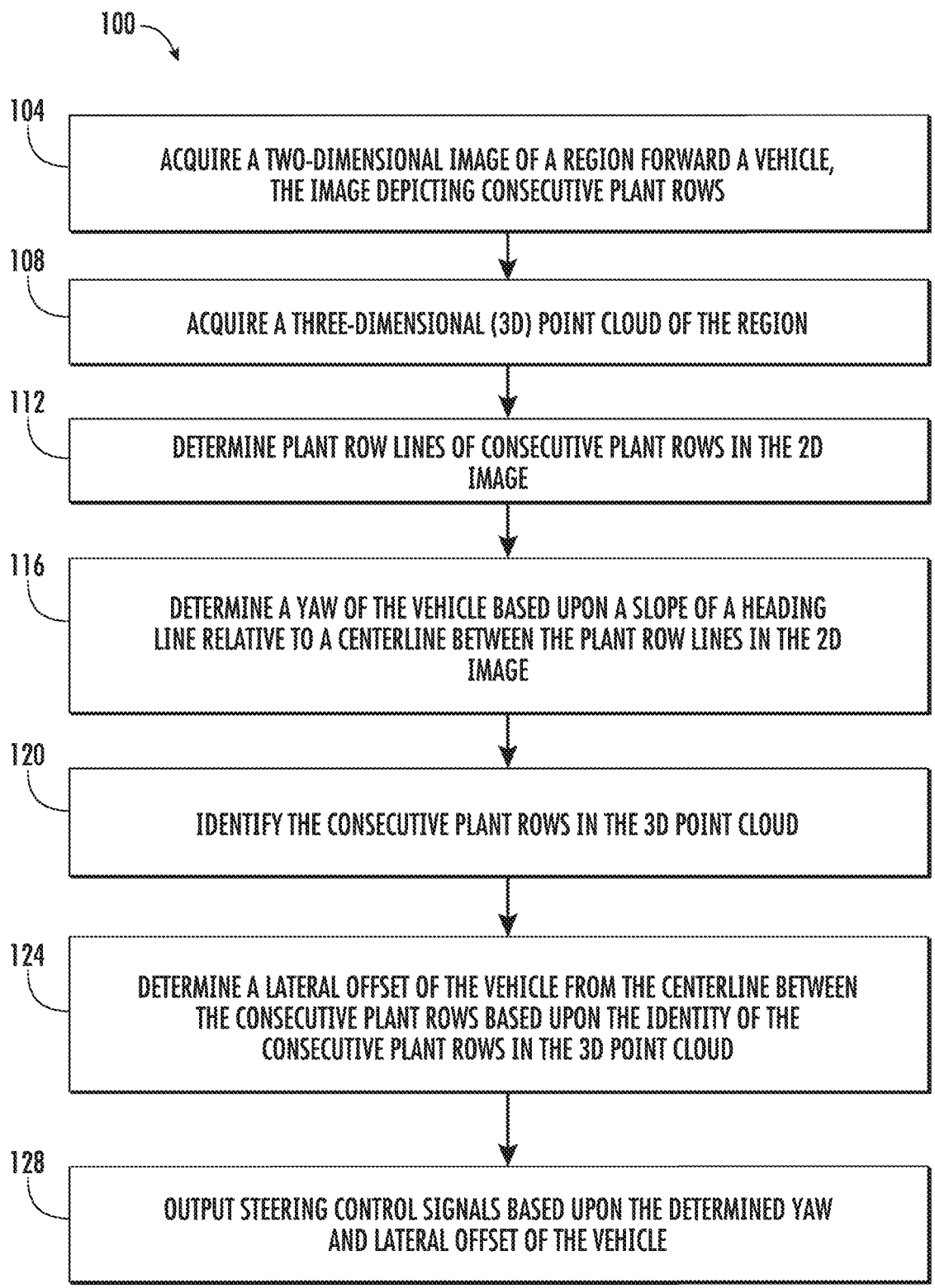
FIG. 3 is a flow diagram of an example row follow method.

As indicated by block 104 of method 100 in FIG. 3, 2D image acquisition instructions 60 direct processing unit 50 to acquire a 2D image of a region forward vehicle 24, wherein the image depicts consecutive plant rows. This region may be an area in front of vehicle 24 captured along a longitudinal centerline of vehicle 24. Instructions 60 direct processing unit 50 to output control signals actuating the at least one sensor 32 so as to output the signals corresponding to the example 2D image 142 shown in FIG. 1. The example 2D image 142 comprises plant rows 144-1 in 144-2 (collectively referred to as rows 144). In the 2D image 142, plant rows 144 converge towards a vanishing 0.145.

As indicated by block 108 of method 100 in FIG. 3, 3D point cloud acquisition instructions 60 direct processing unit 50 to acquire a 3D point cloud of the region forward the vehicle, the same region for which a 2D image was rendered and acquired. FIG. 1 illustrates an example 3D point cloud 152 corresponding to the region depicted in 2D image 142. Each individual point in 3D point cloud 152 may have an associated set of Cartesian coordinates. In one implementation, the 3D point cloud is generated from a stereo image captured by a stereo camera and transformed to the 3D point cloud using photogrammetry software.

As indicated by block 112 of method 100 in FIG. 3, row line instructions 64 direct processing unit 50 to identify consecutive plant rows in the 2D image 142 and to generate or identify plant row lines corresponding to the axes along which the consecutive plant rows extend in the 2D image 142. To identify the consecutive plant rows in the 2D image, instructions 64 direct processing unit 50 to carry out various image analysis techniques with respect to the 2D image. For example, texture mapping and feature extraction may be used to remove or disregard weeds and other noise in the 2D image 142. A plant may occupy most of the image and such optical analysis may involve an algorithm that analyzes different textures and removes unwanted plants growing in the middle between consecutive rows. A histogram and a vanishing point approach may further be used to remove remaining noise and any weeds or other nontarget plants not removed by the texture mapping feature extraction. Noise between plant rows may lack a pattern compared to plant rows. Moreover, noise or weeds between the plant rows may not fit into a vanishing point. Additional thresholding techniques such as morphology and edge textures may further be used to detect the consecutive plant rows.

Once the consecutive plant rows are identified in the 2D image, the consecutive plant rows 144-1 and 144-2 may be fit or defined by lines 148-1 and 148-2 (collectively referred to as lines 148), respectively, which intersect the individual plants 149 of the plant rows 144 and which may converge towards a vanishing point. The two crop lines 148 representing the two consecutive plant rows may be fit to structures within the 2D image using a probabilistic Hough Transform. A centerline 150 between the consecutive plant rows 144 may be determined from the left and right plant row lines 148.

As indicated by block 116 of method 100 in FIG. 3, vehicle yaw instructions 66 may direct processing unit 50 to determine the yaw (heading) of vehicle 24 relative to the centerline 150 between the consecutive plant rows 144. As shown in the example in FIG. 1, instructions 66 may direct processing unit 50 to determine or generate a heading line 151 extending from the camera other sensor that captured the 2D image 142 to the vanishing point 145. A perspective transform may be used to get a birds-eye view of the image and a final slope of the heading line 151 from which the yaw of vehicle 24 (the direction in which vehicle 24 is aimed) is calculated. The slope of heading line 151 is a function of the angle A of the heading line 151 with respect to the centerline 150. In circumstances where vehicle 24 is laterally offset with respect to the centerline 150 and has a heading or steering angle not parallel to rows 144, the heading 152 may have a slope and may be angularly offset from the centerline by an angle A. In circumstances where vehicle 24 is centered between rows 144 and is aimed in a direction parallel to rows 144, the heading 152 may coincide with centerline 150 and the angle A will be zero. Such information may be used with the point cloud information to find the lateral offset of the vehicle 24 from the centerline 150.

As indicated by block 120 of method 100 in FIG. 3, point cloud row identifying instructions 68 direct processing unit 50 to identify the consecutive plant rows 144 in the 3D point cloud 152. As part of this process, processing unit 50 may carry out preprocessing operation such as transforming the point cloud to a frame of the vehicle and removing invalid points. Following the removal of the invalid points, processing unit 50 may apply a ground filter algorithm to separate and remove non-ground points. Upon removal of the ground points, processing unit 50 may separate points apply clustering algorithms to partition the points into clusters that represent separate objects in the 3D space. By identifying such clusters or separate objects in the 3D space, processing unit 50 may remove additional noise from the data. Such structures are then classified and given a label based upon the image detections. For example, clusters corresponding to plants may be labeled as plants which serve to form part of the plant rows. In some implementations, the point cloud may then be compressed along the z-axis and represented as a point cloud image 154. To further identify the plant rows in the 3D point cloud, processing unit 50 may rely upon the identification of the plant row lines 148 in the 2D image 142. Processing unit 50 may use the computed slope of the plant row lines 148, relative to the centerline 150, to assist in fitting lines corresponding to the consecutive plant rows, in the 3D point cloud image.

As indicated by block 124 of method 100 in FIG. 3, lateral offset instruction 70 direct processing unit 50 to determine a lateral offset of vehicle 24 from the centerline 150. This determination is based upon the identity of the consecutive plant rows in the 3D point cloud. The 3D point cloud comprises multiple individual points having known Cartesian coordinates. Such points classified as plants and extending along the identified plant rows in the 3D point cloud serve to provide coordinates for the plant rows. Based upon the coordinates of the plants in each of the plant rows 144 in the 3D point cloud 154, processing unit 50 may determine the direction and distance of the lateral offset LO as indicated in FIG. 1. The lateral offset or intercept may be further refined by processing unit 50 applying particle filtering and density information from the point cloud 154.

As indicated by block 128 of method 100 in FIG. 3, following the determination of the vehicle yaw and lateral offset or intercept of vehicle 24, steering response instruction 72 may direct processing unit 50 to output steering control signals which are based upon the determined yaw and lateral offset of vehicle 24. In some implementations, the steering control signals cause a steering actuator to adjust an orientation of the front wheels to adjust steering of the vehicle 24 without direct human intervention or input.

In some implementations, steering adjustments for vehicle 24 are automatically made by row following unit 28 using the determined vehicle yaw and lateral offset as inputs to a Pure Pursuit tracking algorithm. The Pure Pursuit tracking algorithm calculates the curvature that will move a vehicle from its current position to a goal position. The goal position is a distance ahead of the vehicle 24 on the path. In one example, the vehicle 24 may be simplified into a bicycle model the two front tires are combined into single tire with one output steering angle. A circle is traced around vehicle 24. The location at which a circle intercepts the centerline 150 (the "path") is a tracking point. A lateral/horizontal error from the rear tire to the tracking point is determined. A desired steering angle is then determined based upon the lateral/horizontal error.

In some implementations, the Pure Pursuit tracking algorithm may be modified or tuned, wherein the "lookahead" distance (the radius of the circle trace around the vehicle 24) is adjusted based upon or proportional to the speed of vehicle 24. A lookahead distance that is too small may make the steering too reactive, whereas a lookahead distance that is too large may result in sluggish convergence to the path. At lower set or sensed vehicle speeds, the lookahead distance is smaller or reduced by row following unit 328 when carrying out the Pure Pursuit tracking algorithm. At higher set or sensed vehicle speeds, the lookahead distance is increased or is made larger by row following unit 328 when carrying out the Pure Pursuit tracking method.

In some implementations where vehicle 24 is manually steered or driven, such steering control signals may cause the output of alerts or steering guidance to the human operator controlling the navigation of vehicle 24. For example, should vehicle 24 stray from a prescribed path between consecutive crop rows during such manual steering by an operator, vehicle 24 may output an alarm or other notice suggesting correction by the operator. For example, in some implementations, a display may present a predefined path for vehicle 24 and may also present the current path of vehicle 24 on the same screen, wherein the current path of vehicle 24 may be adjusted on the screen as the human operator adjusts the steering. In such an implementation, the human operator may adjust the steering left such as by turning a steering wheel, moving a joystick or the like until the displayed line on the monitor representing or indicating the current path of vehicle 24 coincides with the line on the monitor representing the target path of vehicle 24 between the consecutive pairs of plant rows.

Figure 4:
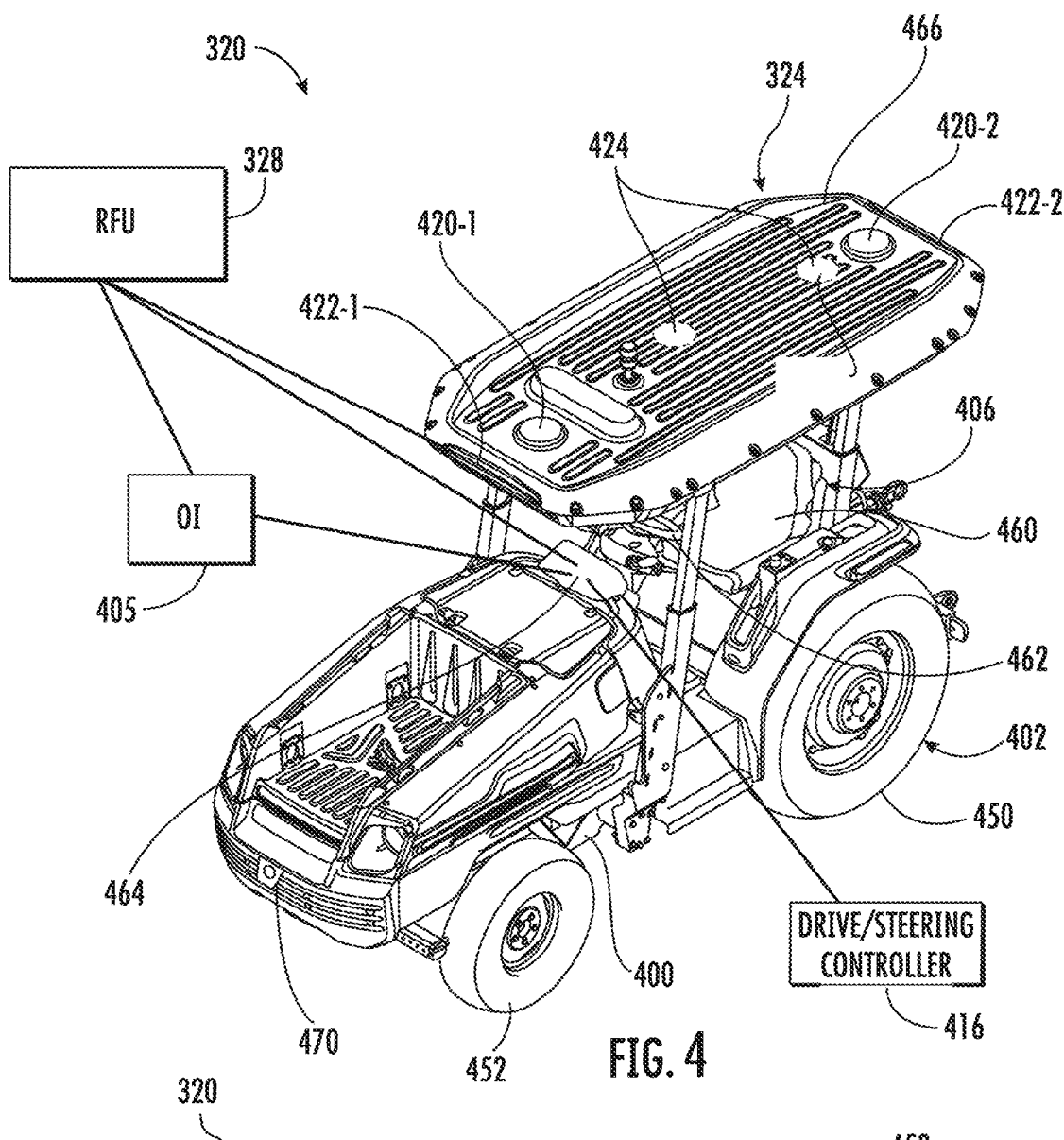
FIG. 4 is a perspective view of an example row follow system.
Figure 5:
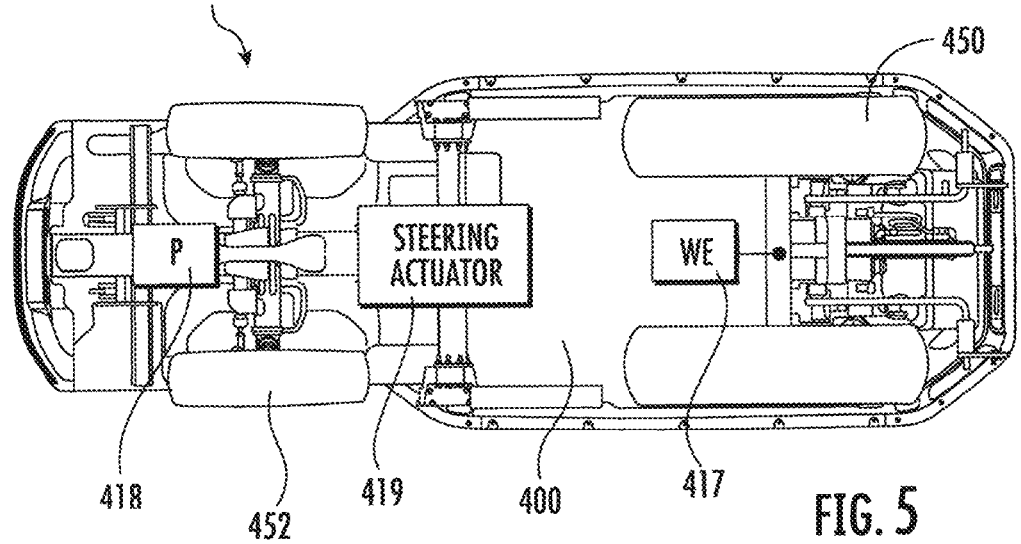
FIG. 5 is a bottom view of the example row follow system of FIG. 4.

FIG. 4 is a perspective view illustrating portions of an example row following system 320. FIG. 5 is a bottom view of the row following system 320. FIGS. 4 and 5 illustrating example of how the schematically illustrated row following system 20 may be embodied in a vehicle, shown as an example tractor 324. Row following system 320 comprises tractor 324 and row following unit 328

Tractor 324 comprises a vehicle that may be employed in various settings such as an agricultural setting, a residential setting or a construction setting. Tractor 324 may be used for a variety of purposes in agricultural construction and residential purposes. Tractor 324 may be used to push or pull an implement. Tractor 324 may include attachments, such as a bucket, blade, backhoe, or the like for digging, displacing, and/or carrying various materials such as earthen materials, animal waste and produce. Tractor 324 may include forks or other coupling mechanisms for engaging pallets, bins, boxes, or the like, wherein the tractors carry and/or lift the engaged items.

Tractor 324 comprises chassis 400, ground propulsion members 402, drive/steering controller 404, operator interface 405, vehicle cab 406, drive/steering controller 416, wheel encoder 417 potentiometer 418, steering actuator 419, steering actuator global positioning system (GPS) units 420-1 and 420-1 (collectively referred to as GPS units 420), stereo cameras 422-1, 422-2 (collectively referred to as cameras 422) and inertial measurement units 424.

Ground propulsion members 402 comprise members that engage the underlying terrain and which are driven. In the example illustrated, ground propulsion members 402 comprise rear wheels 450 and front wheels 452. In the example illustrated, rear wheels 450 are driven by an electrical drive while front wheels 452 are manipulated or turned by steering actuator 419. In other implementations, ground propulsion members 402 may comprise tracks or other ground engaging members.

Operator interface 405 comprises a device by which a human operator may input controls, commands and/or selections to drive/steering controller 416 and/or row follow unit 328 or may receive info regarding the current and target paths of tractor 324. Operator interface 405 may be in the form of a button, switch, touchscreen, keyboard, touchpad, microphone with associated speech recognition, monitor, or the like. Operator interface 405 facilitates entry into and exit from a row follow mode by an operator. In some implementations, operator interface 405 may include a display screen or monitor for displaying the target path for tractor 324 and the current path for tractor 324 based upon the detected yaw and lateral offset of tractor 324.

Drive/steering controller 416 comprises a processing unit and associated non-transitory computer-readable medium containing instructions for directing the processing unit to output control signals for controlling the steering and speed at which tractor 324 moves. Such control signals may be generated in response to a computer program controlling automatic navigation and automated operations of tractor 324. In some implementations, the control signals may direct tractor 324 along a predefined preprogrammed route or path between rows of plants are within a field, orchard or vineyard. In some modes or in some implementations, such control signals may be generated in response to inputs received from an operator remote from tractor 324, not residing in cab 406. In some modes or in some implementations, such control signals may be generated in response to inputs received from an operator providing input which is captured by camera unit 422. In some modes or in some implementations, such control signals may be generated in response to inputs from an operator residing within 406.

Cab 406 comprises a compartment in which an operator may be seated when operating tractor 324. Cab 406 comprises a seat 460, a steering wheel 462, a control console 464 and a roof 466. Roof 620 extends over control seat 460 and control console 464. In some implementations, roof 466 may be raised and lowered.

Wheel encoder 417 comprises a sensor that detects the rotation of rear tires 450 and output signals from which the speed of tractor 324 may be determined. Potentiometer 418 is coupled to the front tires 452 and outputs signals corresponding to the steering angle of front wheels 452. Steering actuator 419 comprises an actuator to reposition wheels 4522 adjust the steering angle of tractor 324. In some implementations, steering actuator 419 may comprise a hydraulic pump and hydraulic cylinder-piston assemblies to adjust the steering angle of front wheel 452.

GPS units 420 are supported by roof 466. Each of GPS units 420 comprises a GPS antenna. In the example illustrated, GPS unit 420-1 is located at a front end of roof 466, forward of a rear axle while GPS unit 420-2 is located at a rear end of roof 466, rearward of the rear axle. GPS units 420 receive signals from satellites, from which the geographical location of tractor 324, such as defined by its base link or rear axle center, may be determined. In some implementations, tractor 324 may comprise a single GPS antenna.

Cameras 422-1 and 422-2 are supported by roof 466 at a front end and a rear of roof 466, facing in forward and rearward directions, respectively. Each of stereo cameras 422 have two or more lenses with a separate image sensor or film frame for each lens. The stereo camera output signals for both the 2D image and the 3D point cloud. In some implementations, the three-dimensional images captured by the stereo camera may be transformed into the 3D point cloud with photogrammetry software. In some implementations, a two-dimensional camera may be used for the 2D image and other sensors, such as a LIDAR sensor may be used for the 3D point cloud. Camera 422-1 captures stereo images in front of tractor 324. Camera 422-2 captures stereo images towards a rear of tractor 324.

Inertial measurement units 424 are supported in roof 466. Inertial measurement units 424 comprises electronic devices that measure and report angular rate of movement, force and orientation of a body. Such inertial measurement units 424 may utilize a combination of accelerometers, gyroscopes and/or magnetometers. Inertial measurement units 424 may be used to calculate altitude, angular rates, linear velocity and position.

Row follow unit 328 is similar to row follow unit 28 described above and may be configured to carry out method 100. Row follow unit 328 comprises processing unit 50 and non-transitory computer-readable medium 52 described above. FIGS. 6-13 illustrate an example of row following unit 328 carrying out row following method for tractor 324.

Figure 6:
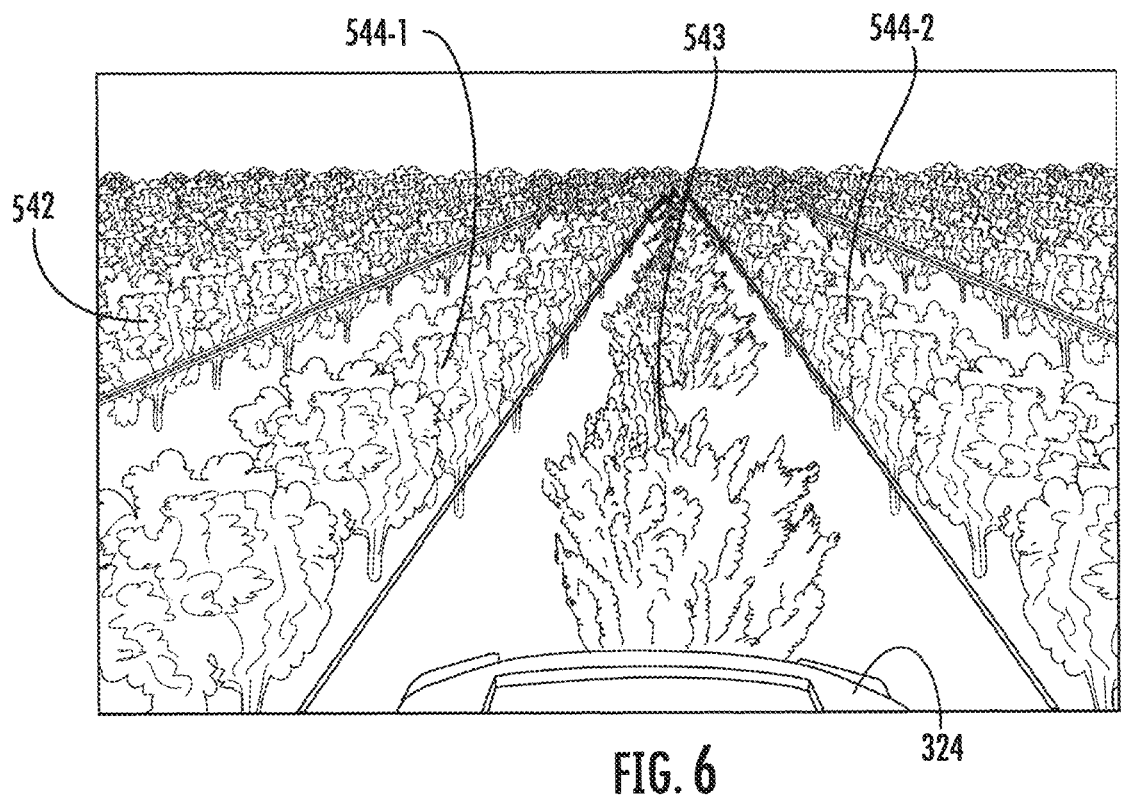
FIG. 6 is a diagram illustrating an example 2D image captured by the example row follow system of FIG. 4.

FIG. 6 illustrates an example 2D image 542 captured by stereo camera 422-1 pursuant to block 104 of method 100. As shown by FIG. 6, 2D image 542 captures a front end of tractor 324 as well as two consecutive plant rows 544-1 and 544-2. The raw 2D image 542 includes other structures such as weeds 543.

Figure 7:
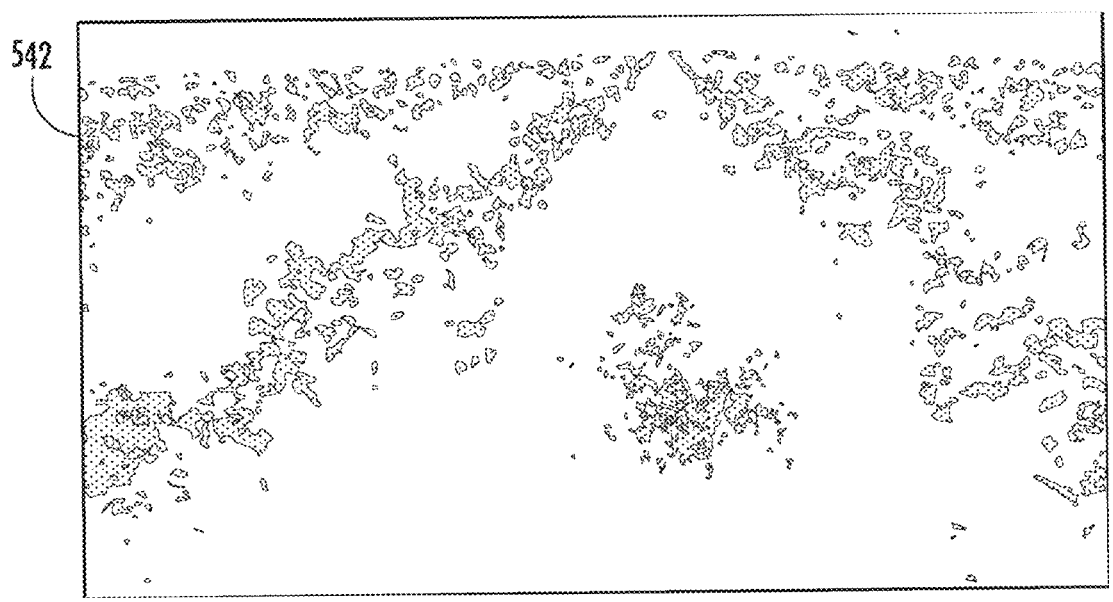
FIG. 7 is a diagram illustrating the example 2D image of FIG. 6 following texture mapping and feature extraction.
Figure 8:
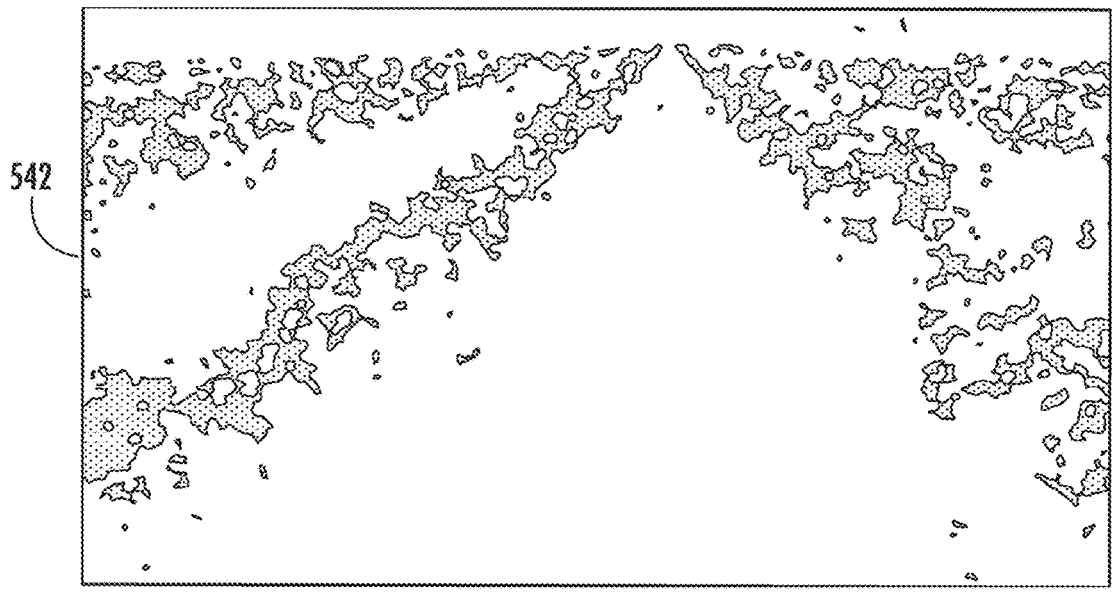
FIG. 8 is a diagram illustrating the example 2D image of FIG. 7 following application of a histogram and a vanishing point approach to remove noise.
Figure 9:
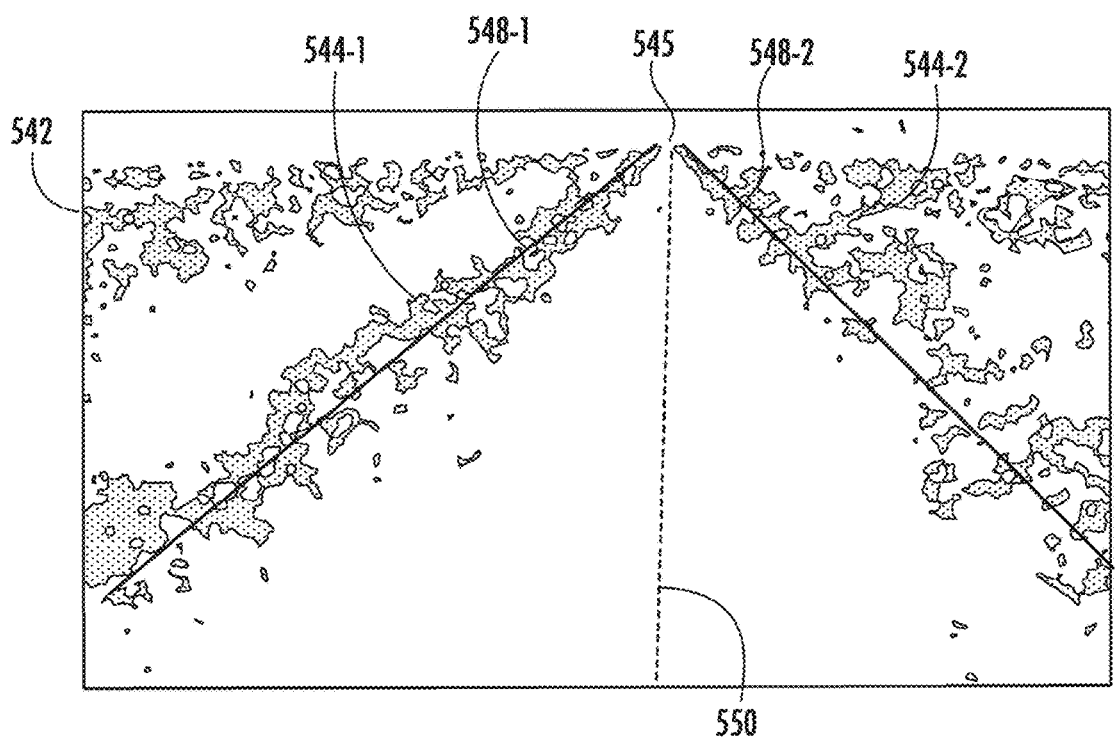
FIG. 9 is a diagram illustrating the example 2D image of FIG. 8 following the determination of plant row lines in the 2D image.

FIGS. 7-9 illustrate an example of how row following unit 328 determines plant row lines for the consecutive plant rows 544-1 and 544-2 in the 2D image 542. FIG. 7 illustrates the 2D image 542 after processing unit 50 has used texture mapping any feature extractor to remove many of the weeds 543 and other noise. In doing so, processing unit 50 looks at different textures and removes unwanted plants which are growing in the middle of the (collectively referred to as rows 544) 544.

FIG. 8 illustrates further image processing by processing unit 50. In FIG. 8, any remaining noise (left over weeds which were not removed by texture mapping and feature extraction) are removed by processing unit 50 applying a histogram in a vanishing point approach. The prior weed 543 (shown in FIG. 7) (noise) does not have a pattern compared to the vine rows 544 does not fit into a vanishing point.

FIG. 9 illustrates the determination of plant row lines 548-1 and 548-2 (collectively referred to as lines 548) in the 2D image 542 pursuant to block 112 of method 100. In the example illustrated, processing unit 50 enhances the remaining image 542 by applying thresholding techniques such as morphology and edge detection. Following such enhancement, processing unit 50 uses a Probabilistic Hough Transform to fit plant row lines 548-1 and 548-2 to the plant rows 544-1 and 544-2, respectively. Based upon plant row lines 548, processing unit 50 may determine a centerline 550. The centerline 550 may be determined by determining a line that extends from a vanishing point 545 and bisects lines 48 such that centerline 550 is angularly spaced from lines 548 by equal angles. Centerline 550 is equally laterally spaced from plant row lines 548. As discussed above with respect to block 116, processing unit 50 may utilize the slope of the heading line relative to the centerline 550 to determine the yaw of tractor 324. As should be appreciated, the yaw of tractor 324 may likewise be determined using other geometric values or determinations which may be derived from, may be related to or may correspond to the slope of the heading line relative to centerline 550. For example, the angle of the heading line relative to row line 548-1 and/or row line 540-2 may be used to determine the yaw of tractor 324.

Figures 10, 11:
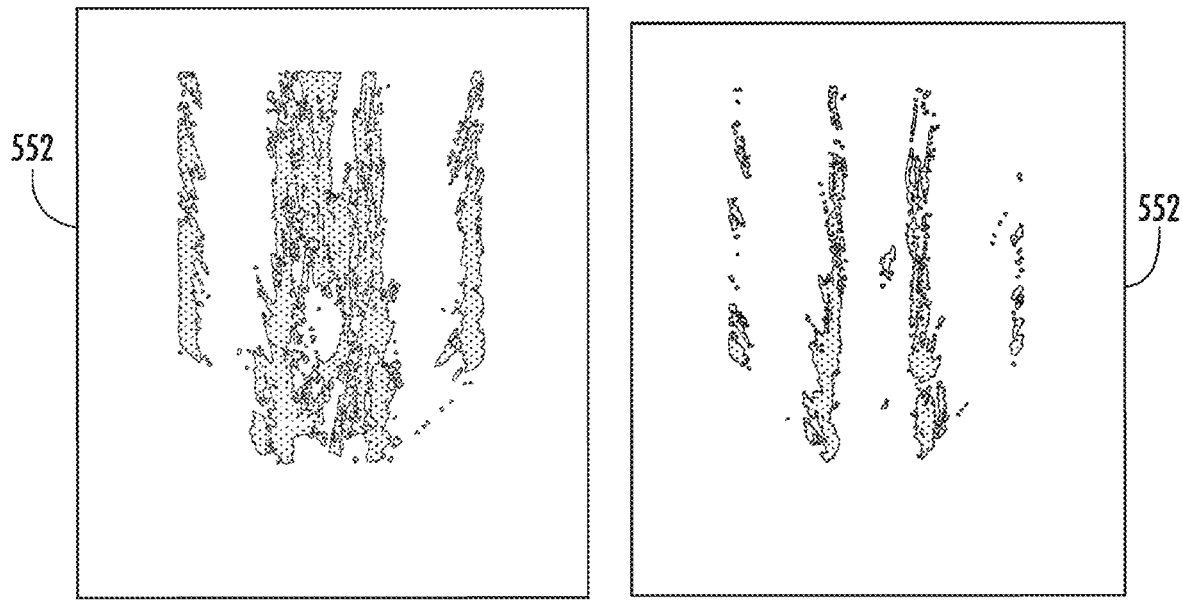
FIG. 10 is a diagram illustrating an example 3D point cloud corresponding to the example 2D image of FIG. 6.
FIG. 11 is a diagram illustrating the example 3D point cloud of FIG. 10 following removal of ground points.

FIGS. 10-13 illustrate an example of how the intercept or lateral offset of tractor 324 may be determined. FIG. 10 illustrates an example 3D point cloud 552 determined from signals received from stereo camera 422-1, pursuant to block 108 of method 100. In some implementations, the three-dimensional images captured by the stereo camera may be transformed into the 3D point cloud with photogrammetry software. The 3D point cloud shown in FIG. 10 results from preprocessing operations being carried out by processing unit 50 on the original raw 3D point cloud. Such preprocessing operations may include transforming the point cloud to a frame of tractor 324 and removing invalid points.

Figures 12, 13:
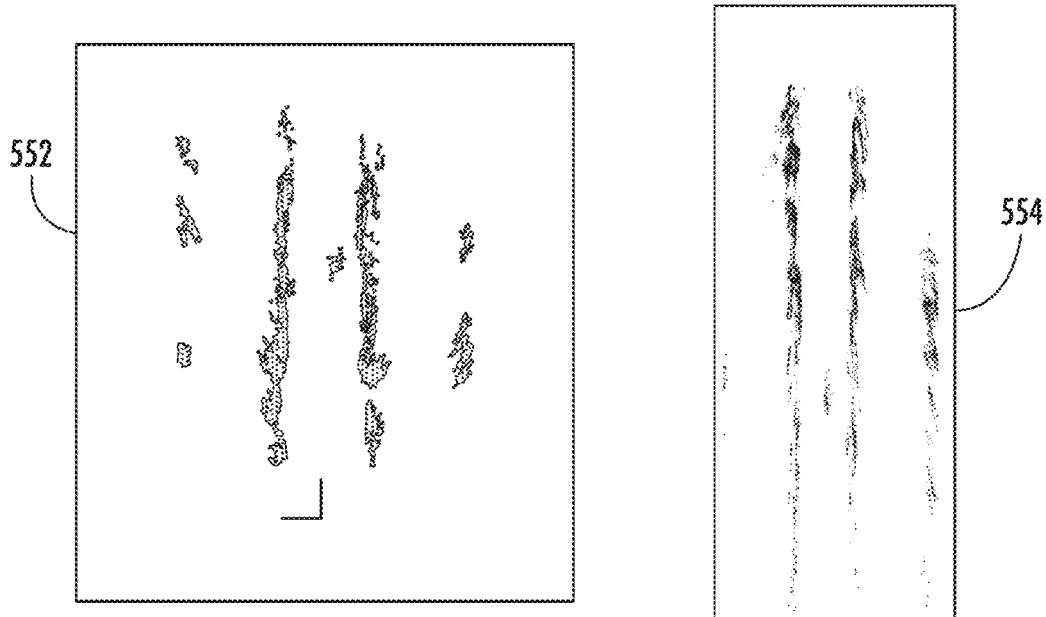
FIG. 12 is a diagram illustrating the example 3D point cloud of FIG. 11 following clustering and classification and the removal of noise.
FIG. 13 is a diagram illustrating the example 3D point cloud of FIG. 12 following compression along a z-axis.

FIG. 11 illustrates the 3D point cloud 552 after processing unit 50 has applied a ground filter. For example, a ground filter process may be applied to separate the ground and non-ground points such that the non-ground points are retained. FIG. 12 illustrates the 3D point cloud 552 after processing unit 50 has grouped the remaining points into clusters representing separate objects in 3D space. Those unclustered points are removed as noise. Each of the clusters may be classified and labeled. FIG. 13 illustrates a final processed point cloud image 554 which has been compressed along the z-axis to represent an image. The 3D point cloud image 554 provides Cartesian coordinates for the plants in the consecutive plant rows. These coordinates may be used to determine whether the vehicle is centered between the consecutive plant rows and whether the vehicle is laterally offset from the centerline which equally bisects the space between the consecutive plant rows.

As discussed above in blocks 120 and 124 of method 100, processing unit 50 identifies the consecutive plant rows in the 3D point cloud image 554 and determines a lateral offset of tractor 324 from the centerline 550 based upon the identity of the consecutive plant rows in the 3D point cloud. In some implementations, the determined slope of the heading line and the identification of plant row lines 148 in the 2D image may be correlated to the 3D point cloud image 554 to assist in identifying the consecutive crop rows in the 3D point cloud image. The points lying in the identified consecutive crop rows in the 3D point cloud image 554 further identify the spacing between the crop rows, wherein one half of that spacing would be the lateral location of the centerline 150. Using the slope of the heading line 151, processing unit 50 may use geometry to determine the location of the lateral offset or intercept 153 (shown in FIG. 1).

Once the yaw and the lateral offset of tractor 324 have been determined, row following unit 328 may output steering control signals which are based upon the determine yaw and lateral offset of tractor 324. In some implementations, the steering control signals cause steering actuator 419 to adjust an orientation of the front wheels 452 to adjust the steering of tractor 324 without direct human intervention or input.

In some implementations where tractor 324 is manually steered or driven, such steering control signals may cause the output of alerts or steering guidance to the human operator (who may be seated upon seat 460) controlling the navigation of vehicle 24. For example, should vehicle 24 stray from a prescribed path between consecutive crop rows during such manual steering by an operator, tractor 324 may output an alarm or other notice suggesting correction by the operator. For example, in some implementations, a display of operator interface 405 may present a predefined path for tractor 324 and may also present the current path of vehicle 24 on the same screen, wherein the current path of tractor 324 may be adjusted on the screen as the human operator adjusts the steering. In such an implementation, the human operator may adjust the steering (such as by turning a steering wheel, moving a joystick or the like) until the displayed line on the monitor of input 325 representing or indicating the current path of tractor 324 coincides with the line on the monitor representing the target path of tractor 324 between the consecutive pairs of plant rows.

In some implementations, additional measures may be taken to address any line fitting noise that may exist. For example, in some implementations, vehicle speed signals from wheel encoder 417 and yaw rate of change signals obtained from inertial measurement units 424 may be used to predict or estimate a second yaw and a second lateral offset of the vehicle with respect to the consecutive plant rows. Signals from wheel encoders 417 may indicate a speed which may be used in conjunction with a yaw rate of change determination from the inertial measurement units 424 to determine how the tractor 324 has moved in a horizontal plane and also how the heading of the tractor 324 may have changed over a predetermined time.

This wheel odometry information may be used to correct faulty crop line detections. The second yaw and the second lateral offset may be used as a basis for adjusting the yaw and the lateral offset estimates obtained from the 2D image and the 3D point cloud. In some implementations, the two yaw estimates and the two lateral offset estimates may be fused using a Kalman filter, such as an Extended Kalman filter, to yield a potentially more accurate estimate for the actual yaw/heading and lateral offset of the vehicle.

In some implementations, the estimated heading or yaw of the vehicle (tractor 324) may be made more robust by generating an additional set of estimates for the vehicle yaw using a fully convolutional (neural) network (FCN) and a set of training images. The FCN determined estimate for vehicle yaw may be used to confirm or adjust the vehicle yaw determined from the above-described wheel odometry and the point cloud/2D image as described with respect to method 100. In some implementations, the FCN determined estimate for vehicle yaw may be fused with the same estimates from the real odometer and from the point cloud/2D image using a Kalman filter, such as an extended Kalman filter.

Figure 14:
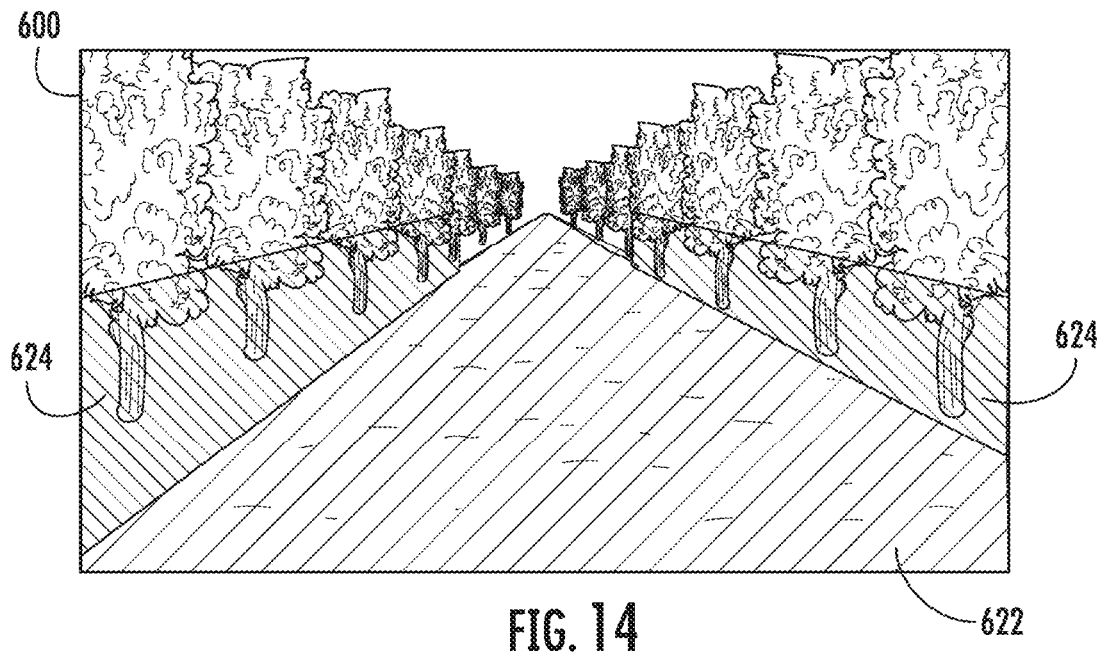
FIG. 14 is a diagram illustrating an example 2D training image depicting consecutive plant rows and annotated with a navigable region and non-navigable or obstruction regions.
Figure 15:
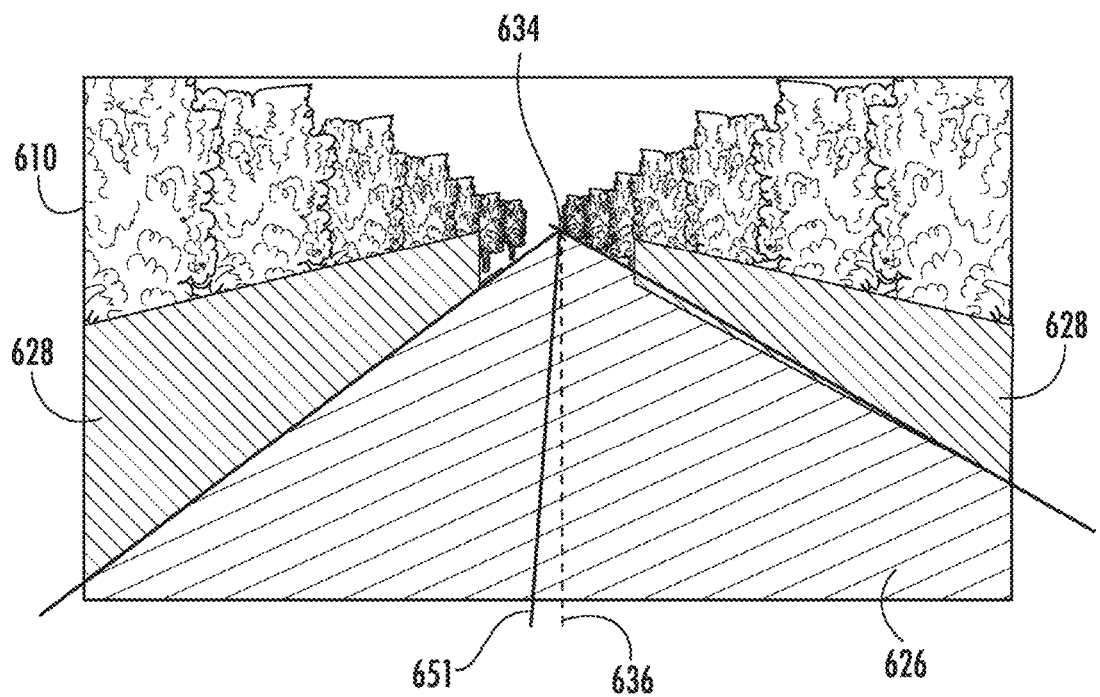
FIG. 15 is a diagram illustrating an example sample 2D image with a navigable region and obstruction regions added based upon learning from the example 2D training image.

FIGS. 14 and 15 illustrate one example of how training images may be generated and used by a FCN to output an estimate for the current yaw/heading/slope of a vehicle (tractor 324). FIG. 14 illustrates an example training image 600 for use by row following unit 328, serving as part of a FCN, wherein the training images effectively teach the FCN how to identify navigable space and obstacles (the plant rows) and subsequently captured 2D images.

The example 2D image (an RGB image) serving as a training image 600 may be captured by a camera 470 (shown in FIG. 4) supported by tractor 324 at a lower front region of tractor 324. In the example, camera 470 is mounted on the front of a hood of tractor 324 at a height sufficiently close to the underlying ground (the bottom surface of tires 450, 452) such that images may be captured of the stems of plants in the two adjacent rows with less interference from overgrown leaves, branches, vines are the like. In one implementation, camera 470 is afforded a height of less than 1 m from the ground and nominally at a height of 0.8 m from the ground. As a result, the images captured by camera 470 provide a clear view of a navigable space as compared to those images captured by camera 422-1.

FIG. 14 further illustrates the addition of training data to the 2D image such that the 2D image may serve as a training image 600. The training data may be manually entered by a person or may be computer-generated based upon image analysis. The training data indicates those regions of the 2D image which may be classified as navigable (region 622) and those regions 624 of the 2D image which may be classified as obstacles (the stems of the plants of the two consecutive plant rows). Different training images 600 may be generated to depict region 622 and 624 at different times of the day, under different lighting conditions, under different weather conditions, at different locations with different terrains, at different plant stages of growth and the like.

FIG. 15 illustrates an example of row following unit 328 (as part of the FCN) generating and overlaying navigable region 626 and obstacle region 628 on a sample 2D image 610 captured by camera 470 as tractor 324 is moving along or is positioned between plant rows. The generation and overlaying of the navigable region 626 and obstacle region 628 is based upon prior learning using the aforementioned training images. In some implementations such learning occurs by the FCN determining and identifying patterns of pixel values or characteristics in the training images. For example, the regions identified as obstruction regions may possess certain pixel characteristics common amongst the training images while the regions identified as navigable regions may possess certain pixel characteristics common amongst the training images. When a new non-training sample images captured by camera 370, the FCN analyzes the sample image to identify pixel regions having the same patterns as those identified in the prior training images 600 and accordingly classifies such pixel regions as navigable (the region between the plant rows) or non-navigable (the plant rows) in the sample image 610.

Once the navigable and non-navigable regions 626, 628 have been identified in a newly received sample image 610 captured by camera 470, row following unit 328 uses the identified regions to determine the heading of tractor 324 (its slope or yaw) in a manner similar to method 100.

For example, row following unit 328 uses the obstruction regions 628 to generate or identify plant row lines 632 corresponding to the axes along which the consecutive plant rows extend in the 2D image 610. To identify the consecutive plant rows in the 2D image, unit 328 may carry out various image analysis techniques with respect to the 2D image. The consecutive plant rows 632 converge towards a vanishing point 634. The two crop lines 632 representing the two consecutive plant rows may be fit to structures within the 2D image using a probabilistic Hough Transform. A centerline 636 between the consecutive plant rows 632 may be determined from the left and right plant row lines 632.

As shown in the example in FIG. 15, row following unit 328 may determine or generate a heading line 651 extending from the camera 470 to the vanishing point 634. A perspective transform may be used to get a birds-eye view of the image and a final slope of the heading line 651 from which the yaw of vehicle 324 (the direction in which vehicle 324 is aimed) is calculated. The slope of heading line 651 is a function of the angle of the heading line 651 with respect to the centerline 636. In circumstances where vehicle 324 is laterally offset with respect to the centerline 636 and has a heading or steering angle not parallel to the plant rows, the heading 651 may have a slope and may be angularly offset from the centerline by an angle A. In circumstances where vehicle 324 is centered between rows 632 and is aimed in a direction parallel to rows 632, the heading 651 may coincide with centerline six and the angle A will be zero.

Figure 16:
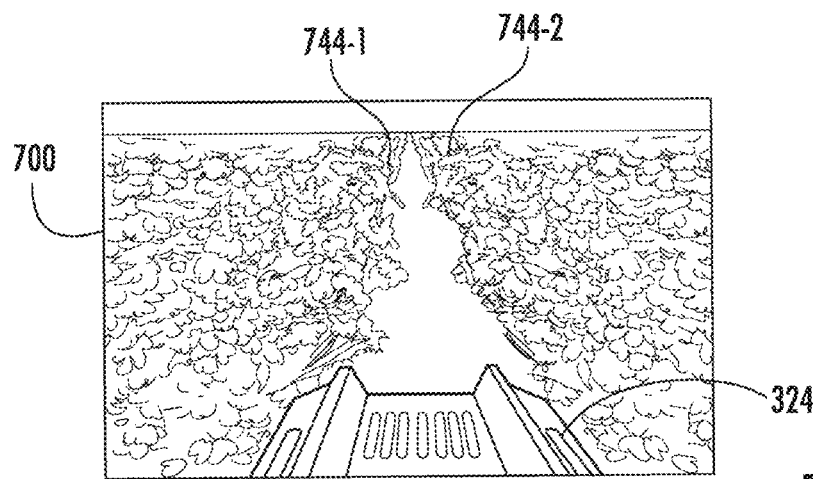
FIG. 16 is a diagram illustrating an example 2D image of an example vehicle between consecutive plant rows.
Figure 17:
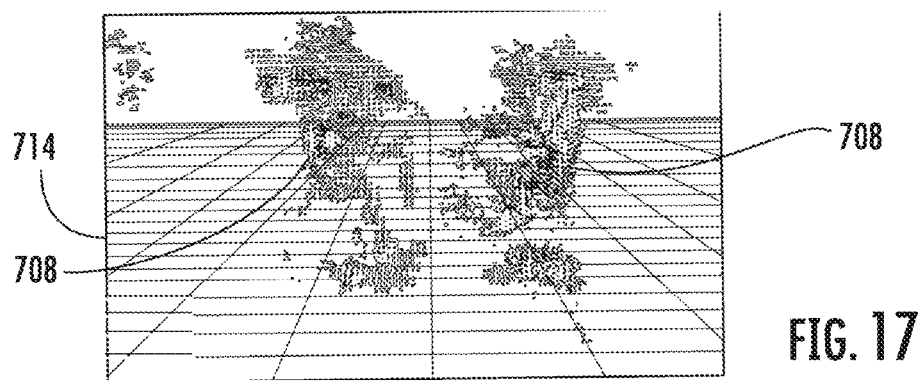
FIG. 17 is a diagram depicting an example horizontal perspective of an example 3D point cloud corresponding to the example 2D image of FIG. 16.
Figure 18:
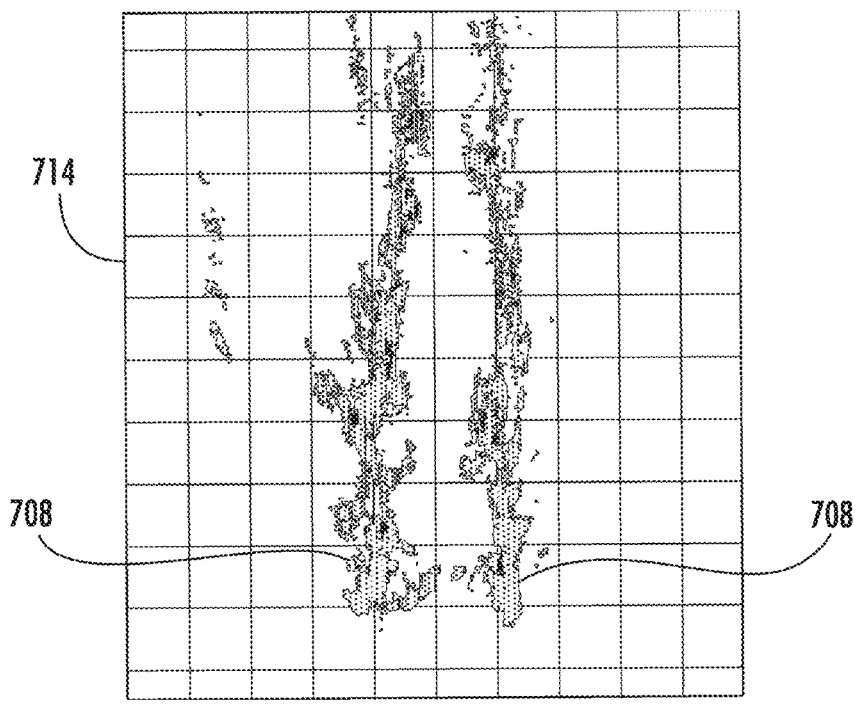
FIG. 18 is a diagram depicting an example overhead perspective of the example 3D point cloud of FIG. 17.

FIGS. 16, 17 and illustrate an example of how the lateral offset estimate for tractor 324 may be alternatively made using particle filtering or be made more robust with the fusion of lateral offset estimate particle filtering. FIG. 16 illustrates an example 2D image 700 captured by camera 422-1 at a particular moment in time (a-frame) and transmitted to row following unit 328. Image 700 depicts tractor 324 positioned her moving between a pair of consecutive plant rows 744-1, 744-2. FIGS. 17 and 18 illustrate example 3D point clouds 704 and 706 which correspond to the 2D image 700. Point clouds 704 and 706 may be captured by camera 422-1 and transmitted to row following unit 328. Point cloud 704 is from a horizontal perspective viewed from the front of tractor 324. Point cloud 706 is an overhead our Birdseye view of the point cloud.

In the example illustrated, plant rows 744-1 and 744-2 comprise vines in a vineyard. Particle filtering is used to estimate vine stem positions with respect to the frame of vehicle 324. When used in other environments, the same particle filtering process may be used to estimate the position of stalks, trunks or other plant portions. For purposes of this disclosure, the term "stem" may be used to refer to vine stems, stalks and trunks. The estimated position of the vine stems on other side of tractor 324 may be used to determine the lateral offset of the tractor from the plant rows.

To estimate the position of a vine stem, row following unit 328 downloads the 3D point cloud 704/706 and stores it in a K-dimensional tree data structure for fast neighbor search and access. Unit 328 carries out an initialization step, wherein 500 particles 708 are generated. The 500 particles 708 constitute a particle filter cloud, a hypothesis representing the vine stem position near the vine rows with a predefined standard deviation and random noise. In other implementations, the 500-particle filter cloud may have a greater or fewer number of such particles.

Following such initialization, row following unit 328 carries out a prediction step in which the change in the vehicle state, its x, y-position and heading from a previous frame are computed. The state of all particles are updated based upon the change in the vehicle state. For each particle of the particle filter cloud, unit 328 checks for neighboring points in the 3D point cloud computes a conditional probability of the particle predicting the vine stem position. Based on the probability value returned, particle weights are updated. During a resampling step, particles within the particle with high weights are retained and the remaining particles are disposed of. The total number of disposed particles are then respawned around the particles with highest weights in the next frame. Thereafter, unit 328 computes a weighted average of all the resampled particles to obtain an estimated vine stem position. The estimated vine stem positions relative to the frame of tractor 324 may be used to estimate a lateral offset (intercept) of the tractor relative to the plant rows.

In some implementations, the heading or yaw determined using the FCN may be used in conjunction with the lateral offset determined using particle filtering to generate steering control signals so as to adjust and realign the positioning of tractor 324 with respect to a desired path between the plant rows, such as a centerline between the plant rows. In some implementations, such an adjustment may be made using the above-described Pure Pursuit tracking method. Unit 328 may direct processing unit 50 to output steering control signals which are based upon the determined yaw and lateral offset of vehicle 324. In some implementations, the steering control signals cause a steering actuator to adjust an orientation of the front wheels to adjust steering of the vehicle 324 without direct human intervention or input.

In some implementations, the various estimates described above for vehicle yaw and lateral offset may be fused together to provide a more robust estimate for such values and for such steering adjustments. For example, in some implementations, the estimated vehicle yaw and lateral offset determined using method 100, determined based upon wheel odometry may be fused with the estimated vehicle yaw from the FCN and the estimated lateral offset from the particle filtering using a Kalman filter, such as an extended Kalman filter to output more robust estimates for the vehicle yaw and lateral offset.

In some implementations where vehicle 324 is manually steered or driven, such steering control signals may cause the output of alerts or steering guidance to the human operator controlling the navigation of vehicle 324. For example, should vehicle 324 stray from a prescribed path between consecutive crop rows during such manual steering by an operator, vehicle 324 may output an alarm or other notice suggesting correction by the operator. For example, in some implementations, a display may present a predefined path for vehicle 324 and may also present the current path of vehicle 324 on the same screen, wherein the current path of vehicle 324 may be adjusted on the screen as the human operator adjusts the steering. In such an implementation, the human operator may adjust the steering left such as by turning a steering wheel, moving a joystick or the like until the displayed line on the monitor representing or indicating the current path of vehicle 324 coincides with the line on the monitor representing the target path of vehicle 324 between the consecutive pairs of plant rows.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A vehicle row follow system comprising:
a vehicle comprising at least one sensor configured to output signals serving as a basis for a three-dimensional (3D) point cloud and to output signals corresponding to a two-dimensional (2D) image of a region forward the vehicle;
a processor; and
a non-transitory computer-readable medium containing instructions to direct the processor to:
output control signals to the at least one sensor to capture a particular 2D image of a region forward the vehicle;
output control signals to the at least one sensor to output the signals serving as a basis for a particular 3D point cloud of the region forward the vehicle;
determine first estimated plant row lines in the 2D image using feature extraction and texture;
determine second estimated plant row lines in the 2D image using a fully convolutional neural network (FCN) and training images and the particular 3D point cloud;
determine a first yaw estimate of the vehicle based upon a slope of a heading line relative to a centerline between the first estimated plant row lines in the 2D image;
determine a second yaw estimate of the vehicle based upon a slope of a heading line relative to a centerline between the second estimated plant row lines in the 2D image;
identify consecutive plant rows in the particular 3D point cloud;
determine a first lateral offset of the vehicle from a centerline between the consecutive plant rows based upon the identity of the consecutive plant rows in the 3D point cloud;
determine a second lateral offset of the vehicle from a centerline between the consecutive plant rows based upon the identity of the consecutive plant rows in the 3D point cloud using the FCN;
obtain wheel odometry and inertial measurement unit signals;
determine a third yaw estimate of the vehicle and a third lateral offset of the vehicle based upon the wheel odometry and the inertial measurement unit signals;
determine a final yaw estimate of the vehicle of the vehicle and the final lateral offset by fusing of the first yaw estimate, the second yaw estimate and the third yaw estimate and by fusing of the first lateral offset, the second lateral offset and the third lateral offset using a Kalman filter; and
output steering control signals based upon the final yaw estimate and final lateral offset of the vehicle.

2. The vehicle row follow system of claim 1, wherein the at least one sensor comprises a stereo camera.

3. The vehicle row follow system of claim 1, wherein the instructions are to direct the processor to use a histogram and a vanishing point to determine the plant row lines in the 2D image.

4. The vehicle row follow system of claim 1, wherein the instructions are to direct the processor to identify the consecutive plant rows in the particular 3D point cloud based upon the determined first estimated plant row lines in the 2D image or based upon the second estimated plant row lines in the 2D image.

5. The vehicle row follow system of claim 1, wherein the fusing is with an extended Kalman filter.

6. A vehicle row following method comprising:
acquiring a two-dimensional (2D) image of a region forward a vehicle, the image depicting consecutive plant rows;
acquiring a three-dimensional (3D) point cloud of the region;
determining first estimated plant row lines corresponding to consecutive plant rows in the 2D image;
determining a first yaw estimate of the vehicle based upon a slope of a heading line relative to a centerline between the first estimated plant row lines in the 2D image;
determining second estimated plant row lines in the 2D image using a fully convolutional neural network (FCN) and training images and the particular 3D point cloud;
determine a second yaw estimate of the vehicle based upon a slope of a heading line relative to a centerline between the second estimated plant row lines in the 2D image;
identifying the consecutive plant rows in the 3D point cloud;
determine a first lateral offset of the vehicle from a centerline between the consecutive plant rows based upon the identity of the consecutive plant rows in the 3D point cloud;
determine a second lateral offset of the vehicle from a centerline between the consecutive plant rows based upon the identity of the consecutive plant rows in the 3D point cloud using the FCN;
obtaining wheel odometry and inertial measurement unit signals;
determining a third yaw estimate of the vehicle and a third lateral offset of the vehicle based upon the wheel odometry and the inertial measurement unit signals;
determining a final yaw estimate of the vehicle of the vehicle and the final lateral offset by fusing of the first yaw estimate, the second yaw estimate and the third yaw estimate and by fusing of the first lateral offset, the second lateral offset and the third lateral offset using a Kalman filter; and
outputting steering control signals based upon the final yaw estimate and final lateral offset of the vehicle;
determining a first lateral offset of the vehicle from the centerline between the consecutive plant rows based upon the identity of the consecutive plant rows in the 3D point cloud; and
outputting steering control signals based upon the determined yaw and lateral offset of the vehicle.

7. The vehicle row follow method of claim 6, wherein the 2D image and the 3D image are acquired with a stereo camera.

8. The vehicle row follow method of claim 6, wherein a histogram and a vanishing point are used to determine the plant row lines in the 2D image.

9. A non-transitory computer-readable medium containing instructions to direct a processor, the instructions comprising:
- 2D image acquisition instructions for acquiring a two-dimensional image of a region forward a vehicle, the image depicting consecutive plant rows;
- 3D point cloud acquisition instructions for acquiring a three-dimensional (3D) point cloud of the region;
- row line instructions for determining a slope of the consecutive plant rows in the 2D image using a fully convolutional neural network and training images;
- vehicle yaw instructions for determining a yaw of the vehicle based upon a slope of a heading line relative to a centerline between the consecutive plant rows in the 2D image;
- point cloud row identifying instructions for identifying the consecutive plant rows in the 3D point cloud;
- lateral offset instructions for determining a lateral offset of the vehicle from the centerline between the consecutive plant rows based upon the identity of the consecutive plant rows in the 3D point cloud; and
- steering response instructions for outputting steering control signals based upon the determined yaw and lateral offset of the vehicle.

10. The medium of claim 9 further comprising adjustment instructions for:
- obtaining wheel odometry and inertial measurement unit signals;
- determining a second yaw of the vehicle with respect to the centerline and a second lateral offset of the vehicle based upon the wheel odometry and the inertial measurement unit signals;
- adjusting the determined yaw of the vehicle and the determined lateral offset of the vehicle based upon the second yaw of the vehicle and the second lateral offset.

11. The medium of claim 9, wherein the row line instructions to direct the processor to identify the consecutive plant rows in the 3D point cloud based upon the determined slope of the consecutive plant rows in the 2D image.

* * * * *